United States Patent [19]

Burley

[11] 3,753,114

[45] Aug. 14, 1973

[54] METHOD AND APPARATUS FOR THE RECOVERY OF SYNCHRONOUS CARRIER IN A DIGITAL COMMUNICATION SYSTEM

[75] Inventor: Cameron H. Burley, Sunnyvale, Calif.

[73] Assignee: Culbertson Industries, Inc., Palo Alto, Calif.

[22] Filed: Dec. 2, 1971

[21] Appl. No.: 204,059

[52] U.S. Cl. .................... 325/320, 178/67, 178/88, 325/30, 329/122, 329/123, 331/22, 331/25

[51] Int. Cl. .......................................... H03d 3/06

[58] Field of Search ................ 178/67, 88; 325/30, 325/320; 329/122, 123, 137; 331/18, 22, 25

[56] References Cited

UNITED STATES PATENTS

| | | | |
|---|---|---|---|
| 3,353,101 | 11/1967 | Kawai et al. | 325/320 |
| 3,358,240 | 12/1967 | McKay | 329/122 |
| 3,600,700 | 8/1971 | Matsuo | 331/17 X |

*Primary Examiner*—Charles E. Atkinson
*Assistant Examiner*—R. Stephen Dildine, Jr.
*Attorney*—William J. Nolan

[57] ABSTRACT

A carrier recovery and coherent detection system in a digital communication system having a quadrature or biphase PSK incoming signal, the incoming signal being divided and transmitted to a pair of radio frequency mixers, these mixers receiving their reference inputs from a voltage controlled oscillator in a phase lock loop, one of the reference signals being phase shifted relative to the other. The outputs of the two mixers are utilized to produce a phase error signal in the phase lock feedback loop to the VCO to synchronize the VCO with the carrier signal. The mixer outputs serve to indicate the proper digital symbol output.

8 Claims, 6 Drawing Figures

Fig_4
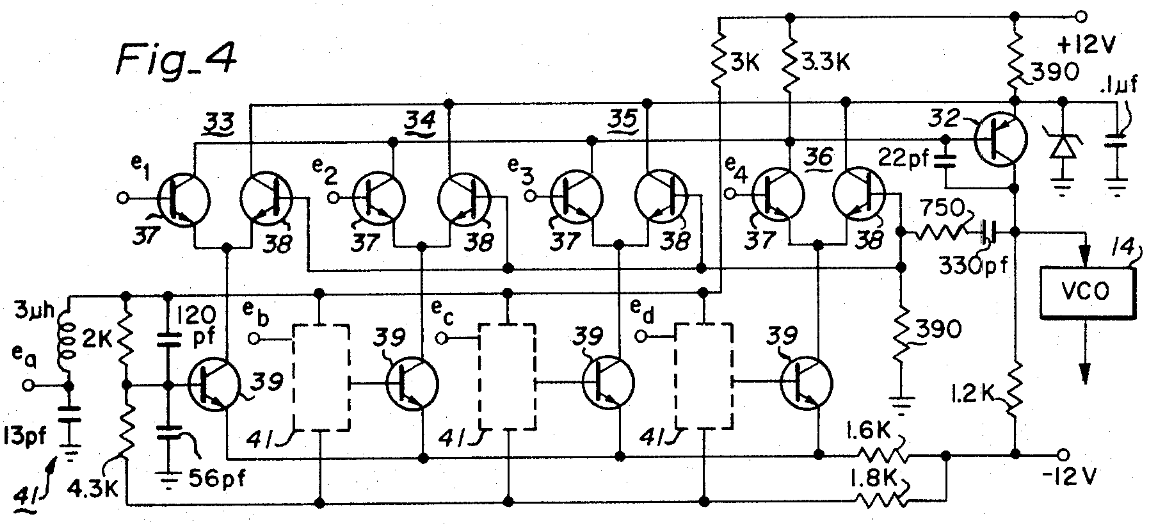
| PHASE DETECTOR OUTPUT | CONNECTED TO | SIGNAL SOURCE AMPLITUDE | | | |
|---|---|---|---|---|---|
| | | $\phi_1$ | $\phi_2$ | $\phi_3$ | $\phi_4$ |
| $E_i \times E_{R1}$ | $e_1$ & $e_d$ | 1 | $0^+$ | -1 | $0^-$ |
| $-E_i \times E_{R1}$ | $e_2$ & $e_c$ | -1 | $0^-$ | 1 | $0^+$ |
| $E_i \times E_{R2}$ | $e_3$ & $e_a$ | $0^-$ | 1 | $0^+$ | -1 |
| $-E_i \times E_{R2}$ | $e_4$ & $e_b$ | $0^+$ | -1 | $0^-$ | 1 |
Fig_5
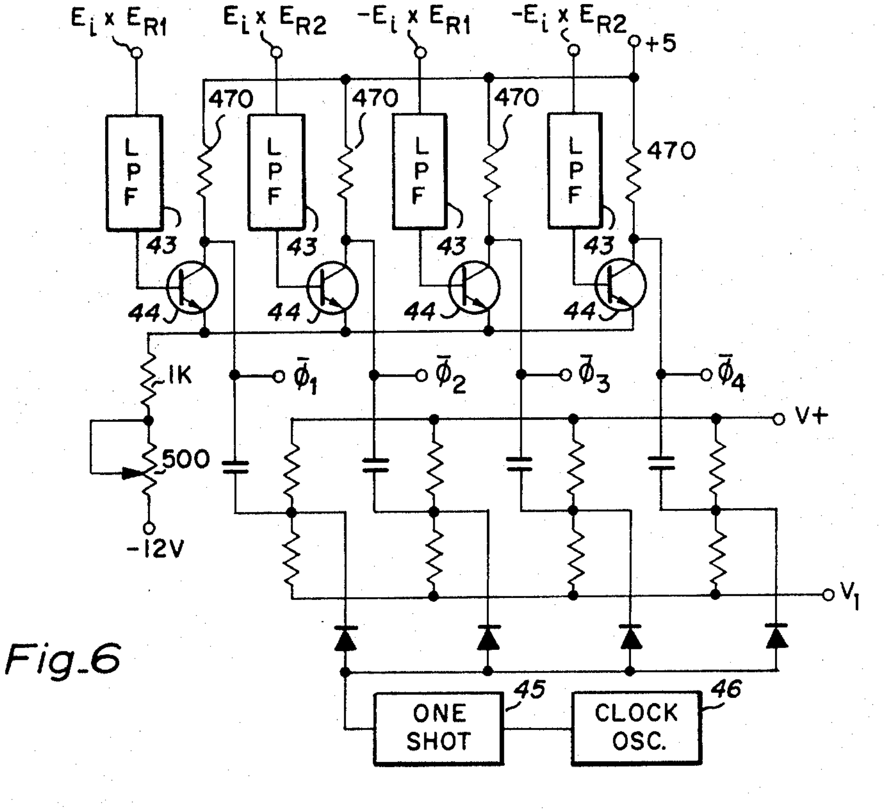
Fig_6

METHOD AND APPARATUS FOR THE RECOVERY OF SYNCHRONOUS CARRIER IN A DIGITAL COMMUNICATION SYSTEM

BACKGROUND OF THE INVENTION

Communication systems are presently in use whereby digital information is transmitted by phase modulation of a radio frequency carrier, for example biphase and quadraphase. In quadrature phase carrier systems, four digital symbols such as 00, 01, 10 and 11 may be transmitted for quadrature phase modulation of the carrier, each of the four different phases of the carrier representing a different one of the four digital symbols. In a biphase system, two digital symbols are transmitted. The receiver circuitry in the system provides apparatus to recover the synchronous carrier to permit coherent detection.

In a typical form of receiver, the four phase phase shift keyed (PSK) IF signal input is transmitted through a "four times" multiplier to a phase comparator circuit. A reference frequency output from a voltage controlled oscillator operating at the frequency of the carrier is also transmitted through a four times multiplier to the phase comparator circuit where it is mixed with the multiplied IF signal. The phase error signal from the comparator circuit is coupled back in a phase-locked loop and serves to control the voltage controlled oscillator to maintain the oscillator in phase coherence with the carrier frequency. The frequency from the voltage control oscillator is also transmitted to a pair of radio frequency mixers, one of these reference frequencies being shifted 90° in phase relative to the other, the other inputs to the two radio frequency mixers being the received phase modulated IF signal. The outputs of these two radio frequency mixers serve to identify the particular one of the four possible digital symbols being transmitted.

In this "four times" frequency multiplication system, great care must be exercised to obtain proper stabilization in the phase lock loop. In addition, the phase errors into the comparator circuit from the two "four times" multiplier circuits must be well-matched since any phase errors at this point in the system will result in phase errors in the two output reference signals from the voltage controlled oscillator to the two RF mixer circuits in the symbol output stage of the system. It is therefore desirable to avoid use of the "four times" frequency multiplication system in the carrier phase lock loop circuitry.

BRIEF SUMMARY OF THE PRESENT INVENTION

In the present invention, a novel carrier recovery and coherent detection system is provided wherein the quadrature phase PSK incoming signal is divided and sent to a pair of radio frequency mixers, the other inputs to the two mixers being reference signals from the voltage controlled oscillator in the phase lock loop, one of said reference signals being phase shifted 90° relative to the other. The outputs of the two radio frequency mixers serve to produce a phase error signal in the phase lock feedback loop to the voltage controlled oscillator to synchronize it with the carrier signal, the outputs from the RF mixer also serving to indicate the proper digital symbol output. The circuit is simple in construction and avoids the use of "four times" multipliers, and the troubles encountered with the "four times" system mentioned above are avoided. This novel apparatus is equally applicable to biphase systems in addition to quadraphase systems.

One embodiment of the invention in a quadraphase system comprises a novel amplifier system wherein a transistor amplifier serving as the feedback amplifier in the phase-lock loop is controlled from a selected one of four different input circuits. One of the four input circuits is activated by a particular associated one of the output signals from the two mixers, and that selected input circuit then responds to the input voltage coupled thereto from an associated one of the other three outputs from the two mixers. Thus, for a particular phase match between incoming IF signal and reference RF signal indicated by the strong positive signal on one of the detector outputs, the output on one of the other three outputs will serve as the control signal for developing the phase error voltage to the VCO.

BRIEF DESCRIPTION OF THE DRAWINGS

FIG. 4 is a schematic diagram of the signal selection circuit in the carrier recovery system of FIG. 1.

FIG. 5 is a chart showing the outputs from the two phase detectors for the four different phases of the incoming carrier as well as the feedback signal selection for the phase-lock loop.

FIG. 6 is a schematic diagram of the circuit utilized to produce an output representing the digital symbol delivered on the incoming carrier.

DESCRIPTION OF THE PREFERRED EMBODIMENT OF THE INVENTION

Figure 1:
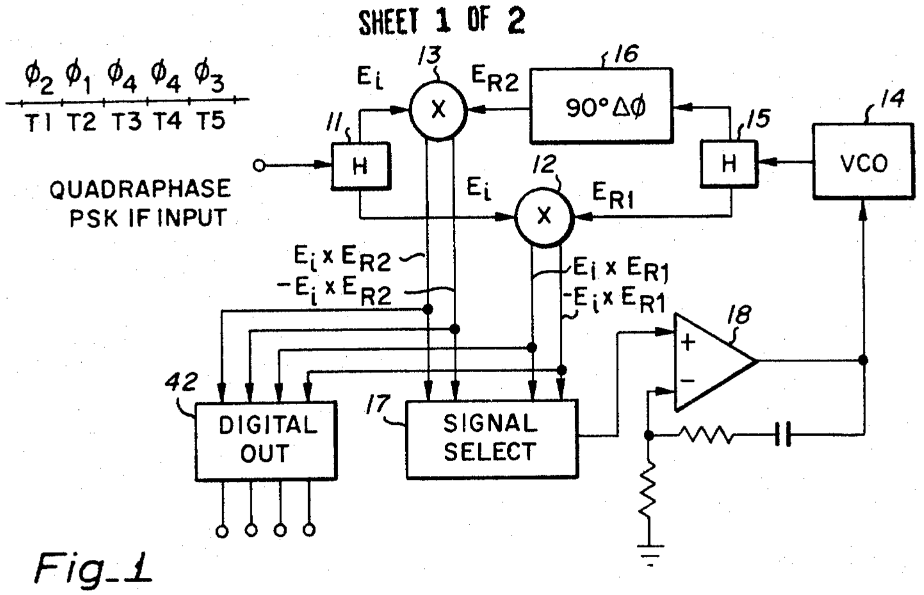
FIG. 1 is a block diagram of the receiver circuitry in a digital communication system for providing carrier phase coherence and symbol synchronization from a four phase phase-modulated incoming signal.
Figure 2:
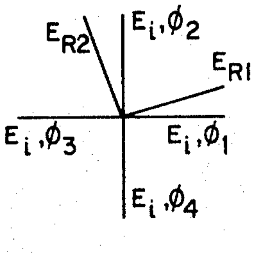
FIG. 2 is a vector diagram illustrating the four possible phases of the incoming IF signal, $E_i$, and the two reference voltages $E_{R1}$ and $E_{R2}$.

Referring now to FIG. 1, the digital communication system provides an incoming radio frequency carrier with any one of four phases at any particular instant in time. For example, five successive time intervals T1 through T5 are shown with the phase of the input signals $E_i$ during these time intervals being one of four phases $\phi_1$ through $\phi_4$, where $\phi_2$, $\phi_3$, and $\phi_4$ are 90°, 180° and 270°, respectively, with reference to $\phi_1$ as illustrated in FIG. 2. The four different phases represnet four different digital symbols such as 00, 01, 10 and 11.

This incoming signal $E_i$ is delivered to a hybrid circuit 11 where the signal is divided and sent to two RF phase detectors or mixer circuits 12 and 13. The other input to mixer 12 is a radio frequency reference voltage $E_{R1}$ transmitted from a voltage controlled oscillator 14 via a hybrid circuit 15. A second reference signal $E_{R2}$ is delivered to the second input of mixer 13, this second reference signal being shifted 90° relative to $E_{R1}$ by means of phase shifter circuit 16. The frequency of the voltage controlled oscillator 14 is substantially the same as the frequency of the carrier input in accordance with phase-lock loop techniques. The two outputs from the phase detector 12 consist of a first voltage with a sign dependent upon the direction of the phase difference between the incoming RF signal $E_i$ and the reference signal $E_{R1}$ and an amplitude dependent upon the amount of such difference, and a second output similar to the first output but with opposite sign. Similarly, there are two outputs from the phase detector 13 related to the phase differences between the incoming signal $E_i$ and incoming reference signal $E_{R2}$.

Figure 3:
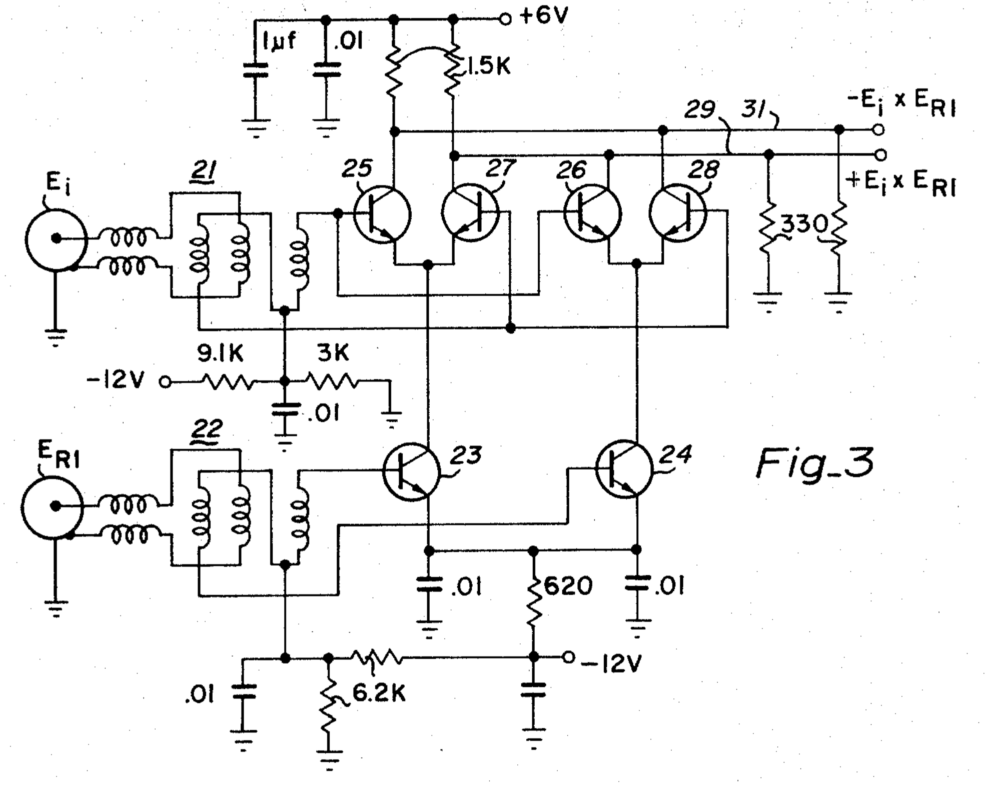
FIG. 3 is a schematic diagram of one of the phase detectors utilized in the system of FIG. 1.

A typical form of phase detector utilized for the RF mixing function of circuits 12 and 13 is shown in schematic form in FIG. 3, this circuit illustrating operation of phase detector 12. The two incoming signals $E_i$ and $E_{R1}$ are received over the balanced input lines 21 and 22, respectively. The signal $E_{R1}$ is applied simultaneously to the bases of the transistors 23 and 24, the voltage on the base of transistor 23 rising as the voltage on the base of transistor 24 decreases and vice versa in an alternating manner responsive to the RF reference voltage signal. As the voltage on the base of one of the transistors rises, the current through that branch of the circuit increases whereas the current through the other transistor branch decreases and thus the currents in the two branches increase and decrease in an alternating fashion. The incoming radio frequency signal $E_i$ is applied in common to the bases of the two transistors 25 and 26, whereas a signal of opposite polarity is coupled in common to the bases of transistors 27 and 28. As the bases of the two transistors 25 and 26 go more positive and the bases of the associated transistors 27 and 28 go less positive, increasing current flows through transistors 25 and 26 and decreasing current through transistors 27 and 28. Thus the currents through transistor branches 23 and 24 are divided through the associated transistor branches 25, 27 and 26, 28, respectively.

It can be seen, therefore, that, assuming the signals $E_i$ and $E_{R1}$ are in phase, a substantial amount of current will flow through transistors 23 and 25 during the positive half-cycle, and through transistors 24 and 28 in the negative half-cycle, resulting in a substantial positive signal on the $+E_1 \times E_{R1}$ output terminal 29 and a substantial negative signal on the $-E_i \times E_{R1}$ ouput terminal 31. Should the two incoming signals $E_i$ and $E_{R1}$ be 180° out of phase, the heavy current paths will be through transistors 23 and 27 and transistors 24 and 26, respectively, and the low current paths will be through transistors 25 and 28 and thus the outputs on the two output terminals 29 and 31 will be of the same amplitudes but of opposite signs to those obtained with in phase incoming signals. With incoming signals of phases different than in-phase and 180° out of phase, the amplitudes of the output signals will be smaller by an amount determined by the extent of phase difference. Thus the outputs of the two phase detector terminals 29 and 31 will be a measure of the direction and extent of the phase match between the two incoming radio signals $E_i$ and $E_{R1}$. The other phase detector 13 is similar to that of phase detector 12 shown in FIG. 3, and produces two outputs, $E_i \times E_{R2}$ and $-E_i \times E_{R2}$, with amplitudes related to the match between the reference voltage $E_{R2}$ and the incoming signal $E_i$.

A substantial positive signal output on one of the four detector outputs serves to indicate the closest phase match between reference and incoming signals. The four detector outputs are coupled to a signal selection circuit 17 which operates to select the proper control signal for the amplifier 18 which provides the feedback signal in the phase-lock loop to the VCO 14 to bring the VCO into phase coherence with the incoming signal $E_i$.

One embodiment of a signal selector circuit 17 is shown in schematic form in FIG. 4 and includes an amplifier circuit 18 comprising transistor 32 with its collector output coupled to the VCO 14 and four separate input circuits 33, 34, 35 and 36 for the amplifier. Each input circuit comprises a pair of parallel connected transistors 37, 38 with their emitters coupled in common to a third transistor 39, the base of which is connected to an incoming circuit 41 comprising a filter and resistor divider circuit. The four separate incoming terminals $e_a$, $e_b$, $e_c$ and $e_d$ to the four amplifier input circuits 33–36, respectively, are connected to differnet ones of the output terminals from the two phase detectors 12 and 13. These connections are shown in the chart of FIG. 5; for example, input terminal $e_b$ is coupled to the phase detector output $-E_i \times E_{R2}$. The bases of the transistors 37 in each of the four input circuits 33–36 are coupled to different ones of the output terminals from the phase detectors 12 and 13, these different connections also being shown in the chart of FIG. 5. For example, terminal $e_1$ of the first input circuit 33 is coupled to output $E_i \times E_{R1}$ from the phase detector 12.

As described above, one of the four outputs from the two phase detectors 12, 13 will have a substantially higher positive amplitude than the other three dependent upon the phase match between the incoming IF signal $E_i$ and the two reference voltages $E_{R1}$ and $E_{R2}$. For example, with a close match between $E_i$ and $E_{R1}$, this positive amplitude signal will appear on output lead $E_i \times E_{R1}$. This positive signal via terminal $e_d$ on the base of the transistor 39 in the fourth input circuit 36 will turn this transistor on while the other three similar transistors 39 in the other three input circuits 33, 34 and 35 remain off. Thus the transistor 32 in amplifier circuit 18 will respond to this input circuit 36 and in particular to the voltage applied to the base of transistor 37 via terminal $e_4$, i.e., the voltage on the output lead $-E_i \times E_{R2}$ of the phase detector 13. This particular input voltage will provide the proper voltage output from the amplifier 32 to serve as the feedback control to the VCO 14 to bring the reference voltage source into phase with the incoming IF signal $E_i$. If, for example, the incoming and reference signals are in phase, the voltage applied to $e_4$ will be such that the feedback signal output from the amplifier is unchanged to maintain the VCO at its operating frequency. If, however, the two signals are out of phase, a small voltage (represented by 0+) will appear on terminal $e_4$ from detector output $-E_i \times E_{R2}$, driving the amplifier transistor 32 so as to produce a feedback signal to the VCO circuit to bring the reference voltage into phase with the incoming signal.

A different phase relationship between the incoming signal and the VCO reference voltage than that assumed above will result in one of the other three input circuits 33, 34 and 35 being activated, placing control of the amplifier circuit 32 under an input voltage from a different one of the phase detector outputs. The various connections between $e_a - e_d$ and $e_1 - e_4$ of the amplifier and the four output leads from the phase detectors 12 and 13 are shown in the chart of FIG. 5.

The four outputs from the phase detectors 12 and 13 are also coupled to a circuit 42 shown schematically in FIG. 6 which is responsive to the voltages thereon to produce the one-of-four digital output symbols. The four detector outputs are coupled through associated low-pass filters 43 to the base of four transistors 44. A positive signal on one of these four input terminals will turn on the associated one of the four transistors 44 to produce an output signal on the associated one of the four binary signal output terminals $\phi_1$ to $\phi_4$. The initiation of the binary output signal at the output terminal also operates through associated control circuitry to trigger a one-shot cricuit 45 which serves to synchronize the clock oscillator 46 in the receiver circuitry with the initiation of the specific time intervals $T_1$, $T_2$, $T_3$ etc. of the transmitted carrier signal.

Although the novel technique has been described with reference to its use in a quadraphase transmission system, it is equally useful in a biphase system. If the system is to be used only for biphase, for example $\phi_1$ and $\phi_3$, an economy in hardware can be achieved by omitting the first two input circuits 33 and 34 in the circuit of FIG. 4 and by omitting the second and fourth switching circuits, coupled to $E_i \times E_{R2}$ and $-E_i \times E_{R2}$, in FIG. 6.

What is claimed is:

1. Apparatus for the recovery of synchronous carrier for coherent detection of a signal in a digital communication system, the incoming signal consisting of a series of successive time intervals of radio frequency signal, the phase of the radio frequency signal during each time interval being any one of a plurality of different phases, said apparatus comprising, means for splitting the incoming signal into two parts, a tunable radio frequency source of substantially the same frequency as said incoming signal, a first radio frequency mixer mixing one of said incoming signal parts with a reference radio frequency signal from said tunable radio frequency source to obtain a pair of output signals with sign dependent on the direction of the phase shift between the incoming signal and the reference signal and with amplitude dependent on the degree of phase shift between the incoming and reference signals, said two output signals having opposite signs, phase shifting means coupled to said radio frequency source for providing a second reference radio frequency signal in quadrature with said first reference signal, a second radio frequency mixer for mixing the second one of said incoming signal parts with said second reference signal to obtain a second pair of output signals with sign dependent on the direction of the phase shift between the incoming signal and the second reference signal and with amplitude dependent on the degree of phase shift between the incoming and second reference signals, said two second output signals having opposite signs, means coupled to said radio frequency mixers and responsive to differnet ones of said four mixer output signals operative to identify the possible phases of the incoming radio frequency signal, selection means coupled to said radio frequency mixers for selecting one of the mixer output signals other than that one output identifying the particular phase of the incoming signal, and amplifier means coupled to said selection means and to said tunable radio frequency source for producing an error signal dependent on said selected one of the mixer output signals to tune said radio frequency source to the frequency of said incoming signal.

2. Apparatus as claimed in claim 1 wherein said incoming signal is biphase.

3. Apparatus as claimed in claim 1 wherein said incoming signal is quadraphase.

4. Apparatus as claimed in claim 1 wherein said amplifier means comprises an output transistor having an input and an output, and said selection means comprises a plurality of separate input circuits each coupled to the input of said output transistor, each input circuit comprising means for activating the associated input circuit responsive to an associated one of the plurality of mixer output signals, and means in said activated input circuit responsive to a different one of said plurality of mixer output signals than said activating one for controlling the input of said transistor circuit.

5. Apparatus as claimed in claim 4 wherein each of said input circuits includes a first transistor in series with a second transistor, said first transistor being activated by said one mixer output signal and providing current to said second transistor, said second transistor responding to said different one of the mixer output signals for controlling the input to said output transistor.

6. A method for the recovery of synchronous carrier for coherent detection of a signal in a digital communication system, the incoming signal consisting of a series of successive time intervals of radio frequency signal, the phase of the radio frequency signal during each time interval being any one of a plurality of different phases, said method comprising the steps of splitting the incoming signal into two parts, mixing one of said incoming signal parts with a reference radio frequency signal of substantially the same frequency from a tunable radio frequency source to obtain a pair of output signals with sign dependent on the direction of the phase shift between the incoming signal and the reference signal and with amplitude dependent on the degree of phase shift between the incoming and reference signals, said two output signals having opposite signs, mixing the second one of said incoming signal parts with a second reference signal from said tunable radio frequency source in phase quadrature with said first radio frequency signal to obtain a second pair of output signals with sign dependent on the direction of the phase shift between the incoming signal and the second reference signal and with amplitude dependent on the degree of phase shift between the incoming and second reference signals, said two second output signals having opposite signs, different ones of said four mixer output signals serving to identify different ones of the possible phases of the incoming radio frequency signal, selecting one of the mixer output signals other than that one output identifying the particular phase of the incoming signal, and producing an error signal dependent on said selected one of the mixer output signals to tune said radio frequency source to the frequency of said incoming signal,

7. The method as claimed in claim 6 wherein said incoming signal is biphase.

8. The method as claimed in claim 6 wherein said incoming signal is quadraphase.

* * * * *